(12) United States Patent
Mach

(10) Patent No.: US 8,594,699 B1
(45) Date of Patent: Nov. 26, 2013

(54) DETERMINING SPEED DEPENDENT SCALING FACTORS

(75) Inventor: Tomasz Henryk Mach, Fleet (GB)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/461,263

(22) Filed: May 1, 2012

(51) Int. Cl.
*H04W 24/00* (2009.01)

(52) U.S. Cl.
USPC .......................................... 455/456.1

(58) Field of Classification Search
USPC ............. 455/436, 441, 456, 444, 456.1, 2.01, 455/422.1, 418, 85.5; 370/329, 310, 342; 717/113
See application file for complete search history.

(56) References Cited

U.S. PATENT DOCUMENTS

| 2002/0132628 A1* | 9/2002 | Matsumoto et al. .......... 455/456 |
| 2010/0120429 A1* | 5/2010 | Kazmi et al. .................. 455/436 |
| 2012/0252463 A1* | 10/2012 | Zou et al. ...................... 455/441 |

FOREIGN PATENT DOCUMENTS

| EP | 1215930 | 6/2002 |
| EP | 1699253 | 9/2006 |

OTHER PUBLICATIONS

Extended European Search Report issued in European Application No. 12166278.7 on Oct. 1, 2012; 6 pages.

* cited by examiner

*Primary Examiner* — Kiet Doan
(74) *Attorney, Agent, or Firm* — Fish & Richardson P.C.

(57) ABSTRACT

Apparatus and methods for self-optimizing speed dependent scaling mechanisms are provided. A user equipment (UE) may determine its mobility state by using the cell reselection parameters included in a system information block message to identify a conjectural average time between cell reselections, calculating a current value of the average time between cell reselections at the UE, and comparing both values to determine its current mobility state. Different speed dependent scaling factors may be selected for a determined mobility state of the UE, allowing adapting the mobility parameters with a finer granularity. The mobility parameters may be adjusted using the corresponding speed dependent scaling factors, which in turn provide enhanced mobility performance for the UE.

18 Claims, 5 Drawing Sheets

DETERMINING SPEED DEPENDENT SCALING FACTORS

FIELD

This disclosure relates to mobility procedures in wireless communication networks and, more particularly, to determining speed dependent scaling mechanism factors.

BACKGROUND

In cellular networks, user equipment (UE) may travel in a large geographical area which often leads to the UE changing serving cells. The UE may conduct mobility procedures such as cell reselection or cell handover to connect with other base stations. The mobility procedures may have different requirements depending on speeds of the UEs physically travelling through geographical areas. For example, a UE travelling at a high speed typically requires a short latency to switch from one cell to another cell. Otherwise, the signal quality with the current serving cell may degrade fast and may result in the UE losing the existing connection. In contrast, a UE travelling at a low speed can tolerate a longer latency to switch between serving cells. For UEs travelling at a low speed, the mobility procedures may include stricter criteria to minimize or otherwise reduce switching back and forth between serving cells, i.e., ping-pong events.

DESCRIPTION OF DRAWINGS

For a more complete understanding of this disclosure, reference is now made to the following brief description, taken in connection with the accompanying drawings and detailed description, wherein like reference numerals represent like parts.

DETAILED DESCRIPTION

The present disclosure is directed to systems and methods for self-optimizing speed dependent scaling for mobility parameters in user equipment (UE). In a cellular wireless network, a UE may execute mobility procedures (e.g., cell reselection, cell handover) to switch a connection from one base station to another base station as the UE travels across cell boundaries. Depending on the speed of the UE, the mobility parameters can be scaled up or scaled down to optimize, maximize, or otherwise increase mobility performance of the UE. In this disclosure, reference to a speed of a UE refers to the speed that a UE moves through space. For example, the mobility parameters such as cell reselection timer and cell reselection hysteresis value may be adjusted based on different UE speeds to increase a cell-reselection success ratio. For another example, mobility parameters such as a time-to-trigger timer and a measurement-report event trigger threshold may be adjusted based on different UE speeds to improve a cell-handover success rate.

To enhance the mobility performance, in some implementations, the UE can determine a mobility state and scaling factors for the mobility parameters by executing one or more of the following: identify a conjectural average time between cell reselections based on broadcasted messages from a base station such as an evolved Node B (eNB); determine a current average time between cell reselections for the UE; compare the conjectural average time between cell reselections and the current average time between cell reselections to determine the mobility state and associated scaling factors; or others. In connection with one or more of these processes, the UE may apply the scaling factors to the mobility parameters and execute mobility procedures using the scaled mobility parameters. In some implementations, the UE may also determine a mobility state and associated scaling factors using a global positioning system (GPS). In either case, the UE may select an appropriate scaling factor for the mobility parameters to improve the performance of the mobility procedures. In some implementations, the granularity of the scaling factors can be increased, and as a result, the values of the mobility parameters can be further fine-tuned. For example, for each mobility state, multiple scaling factors may be associated with one mobility parameter. Additionally, since the UE autonomously determines and adjusts the mobility parameters, the network would need little effort and cost to implement the UE-determined scaling factors.

Figure 1:
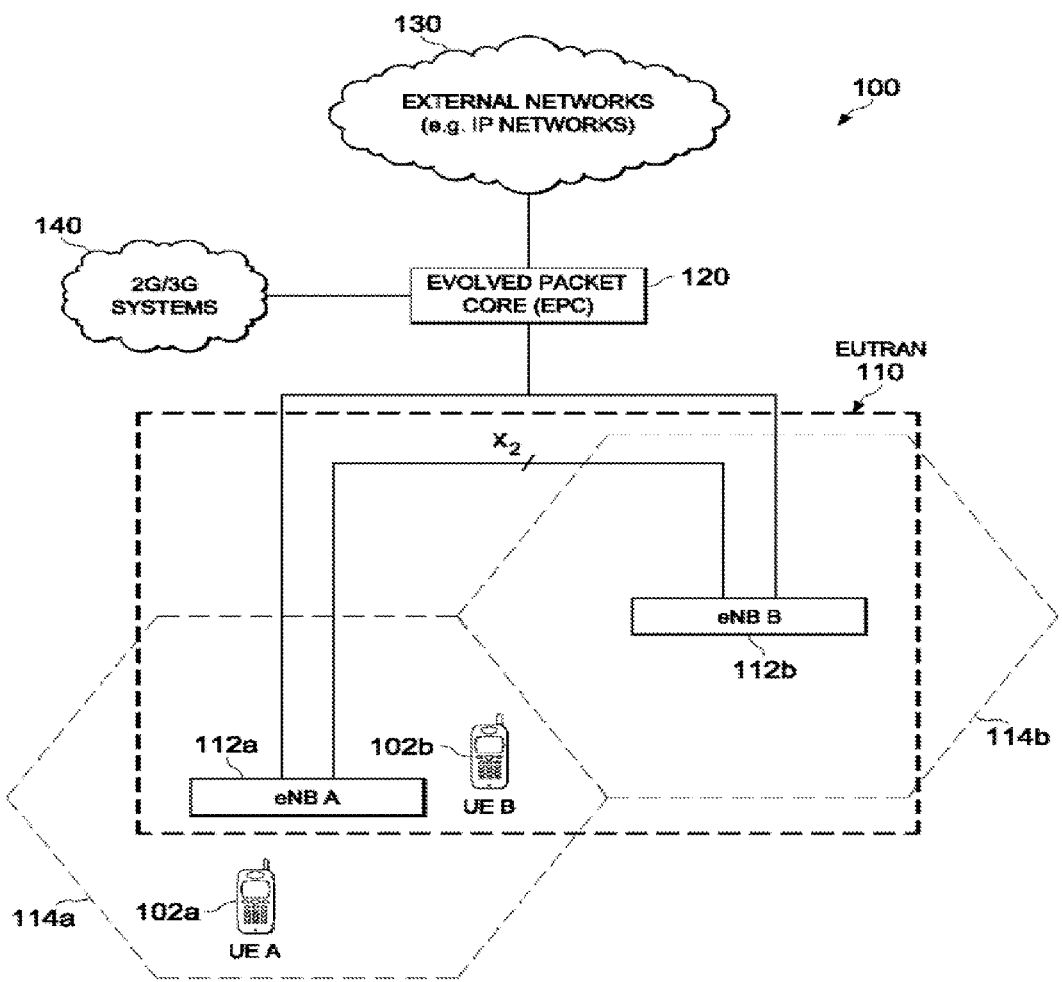
FIG. 1 is a schematic representation of a long term evolution (LTE) wireless cellular communication system.

FIG. 1 is a schematic representation of a long term evolution (LTE) wireless cellular communication system, also known as Evolved Universal Terrestrial Radio Access Network (E-UTRAN). The cellular network system 100 shown in FIG. 1 includes a plurality of base stations 112a and 112b. In the LTE example of FIG. 1, the base stations are shown as evolved NodeBs (eNBs) 112a and 112b. The base stations 112a and 112b may operate in any mobile environment including macro cell, femto cell, pico cell, or the base station may operate as a node that can relay signals for other mobile and/or base stations. The example LTE system 100 may include one or more radio access networks 110, core networks (CNs) 120, and external networks 130. In certain implementations, the radio access networks 110 may be E-UTRANs. In addition, the core networks 120 may be evolved packet cores (EPCs). Further, the system 100 may include one or more mobile electronic devices 102a and 102b. In some implementations, the system 100 may include 2G/3G systems 140 such as Global System for Mobile communication (GSM), Interim Standard 95 (IS-95), Universal Mobile Telecommunications System (UMTS), CDMA2000 (Code Division Multiple Access), or others.

In the example LTE system 100, the EUTRAN 110 includes eNB 112a and eNB 112b. As illustrated, the eNB 112a includes a service area, i.e., cell 114a and the eNB 112b includes a service area indicated as cell 114b. The eNB 112a serves UEs 102a and 102b which operate in cell 114a. Similarly or in contrast to the illustrated system 100, the EUTRAN 110 can include one or more eNBs (e.g., eNB 112a, eNB 112b) and one or more UEs (e.g., UE 102a and UE 102b) without departing from the scope of the disclosure. In this example, the eNBs 112a and 112b communicate directly with the UEs 102a and 102b. In some implementations, the eNB 112a or 112b may be in a one-to-many relationship with the UEs 102a and 102b. For example, the eNB 112a may serve multiple UEs, such as bot UE 102a and UE 102b, within the cell 114a, but each of UE 102a and UE 102b may be connected only to one eNB 112a at a time. In some implementations, the eNBs 112a and 112b can be in a many-to-many relationship with the UEs. For example, UE 102a and UE 102b may be connected to both eNB 112a and eNB 112b. The eNB 112a may be connected to eNB 112b with which mobility procedures (e.g., cell handover, cell reselection) may be executed for one or both of the UE 102a and UE 102b when switching between cell 114a and cell 114b. The eNBs 112a or 112b may determine mobility parameters (e.g., time-to-trigger, measurement report event trigger threshold, cell reselection timer, cell reselection hysteresis parameter) for the UE 102a or 102b which are used to execute mobility procedures. To increase success rates of mobility procedures, the mobility parameters may be scaled up or scaled down depending on the speed of UE 102a or 102b. In some implementations, the UE 102a or 102b may identify a speed or mobility state and determine appropriate scaling factors for the mobility parameters. As such, the UE may maximize, enhance or otherwise increase the mobility performance using the self-scaled mobility parameters. Moreover, the system 100 may need little or no cost and effort to implement the self-scaled mobility parameters.

The UEs 102a and 102b may be any wireless electronic device used by an end user to communicate, for example, within the LTE system 100. The UE 102a or 102b may be referred to as mobile electronic device, user device, mobile station, subscriber station, or wireless terminal. The UE 102a or 102b may be a cellular phone, personal data assistant (PDA), smart phone, laptop, tablet personal computer (PC), pager, portable computer, or other wireless communications device.

The UEs 102a and 102b may transmit voice, video, multimedia, text, web content and/or any other user/client-specific content. On the one hand, the transmission of some of these contents, e.g., video and web content, may include high channel throughput to satisfy the end user demand. On the other hand, the channel between UEs 102a, 102b and eNBs 112 may be contaminated by multipath fading, due to the multiple signal paths arising from many reflections in the wireless environment. Accordingly, the UEs' transmission may adapt to the wireless environment. In short, the UEs 102a and 102b generate requests, send responses, or otherwise communicate in different means with Enhanced Packet Core (EPC) 120 and/or Internet Protocol (IP) networks 130 through one or more eNBs 112.

The UEs 102a and 102b may switch from the coverage of one cell to another cell, for example, from the coverage of the cell 114a to the coverage of the cell 114b. A mobility procedure (e.g., cell handover, cell reselection) may be executed to maintain a connection between the UE 102a or 102b and the EUTRAN 110 when switching between cells. As previously mentioned, different mobility parameters may be used based on the speed of the UE. For high-speed UEs, a smaller time-to-trigger value or cell reselection timer may be used compared to low-speed UEs. For example, a high-speed UE may include a UE moving at speeds in a range including 30 km/h or more. High-speed UEs may move out of the cell coverage quickly and thus need to switch to another cell quickly to maintain a communication session. Also for high-speed UEs, a lower value of the cell reselection hysteresis parameter or measurement report trigger threshold may be used compared to low-speed UEs. For example, a low-speed UE may include a UE moving at speeds in a range including 0-5 km/h].

In general, mobile telecommunication systems include radio access network such as UMTS, CDMA2000 and 3GPP LTE. As illustrated, the LTE telecommunications system 100 includes a Radio Access Network (RAN) referred to as EUTRAN 110. The EUTRAN 110 may be located between UEs 102a, 102b and EPC 120. The EUTRAN 110 includes at least one eNB 112. The eNB 112 can be a radio base station that may control all or at least some radio related functions in a fixed part of the system 100. The at least one eNB 112 can provide a radio interface within the associated coverage area or cell 114 for UE 102a and 102b. The eNBs 112 may be distributed throughout the cellular network to provide a wide area of coverage. In short, the eNB 112 directly communicates with at least one of UE 102a, UE 102b, other eNBs 112, or the EPC 120.

The eNB 112 may be the end point for radio protocols towards the UEs 102a, 102b and may relay signals between the radio connection and the connectivity towards the EPC 120. In certain implementations, the EPC 120 is the main component of a core network (CN). For example, the CN can be a backbone network which may be a central part of the telecommunications system. The EPC 120 can include a mobility management entity (MME), a serving gateway (SGW), and a packet data network gateway (PGW). The MME may be the main control element in the EPC 120 responsible for the functionalities comprising the control plane functions related to subscriber and session management. The SGW can serve as a local mobility anchor, such that the packets are routed through this point for intra EUTRAN 110 mobility and mobility with other legacy 2G/3G systems 140. The SGW functions may include the user plane tunnel management and switching. The PGW may provide connectivity to the services domain comprising external networks 130, such as the IP networks. The UE 102, EUTRAN 110, and EPC 120 may be referred to as the evolved packet system (EPS).

While the following disclosure is described with respect to the LTE system 100 of FIG. 1, the present disclosure is not limited to this environment. In general, cellular telecommunication systems may be described as cellular networks made up of a number of radio cells or cells that are each served by a base station or other fixed transceiver. The cells are used to provide radio coverage over different areas. Example cellular telecommunication systems include Global System for Mobile Communication (GSM) protocols, Universal Mobile Telecommunications System (UMTS), 3GPP Long Term Evolution (LTE), and others. In addition to cellular telecommunication systems, wireless broadband communication systems may also be suitable for the various implementations described in the present disclosure. Example wireless broadband communication systems include IEEE 802.11 wireless local area network, IEEE 802.16 WiMAX network, or others.

Figure 2:
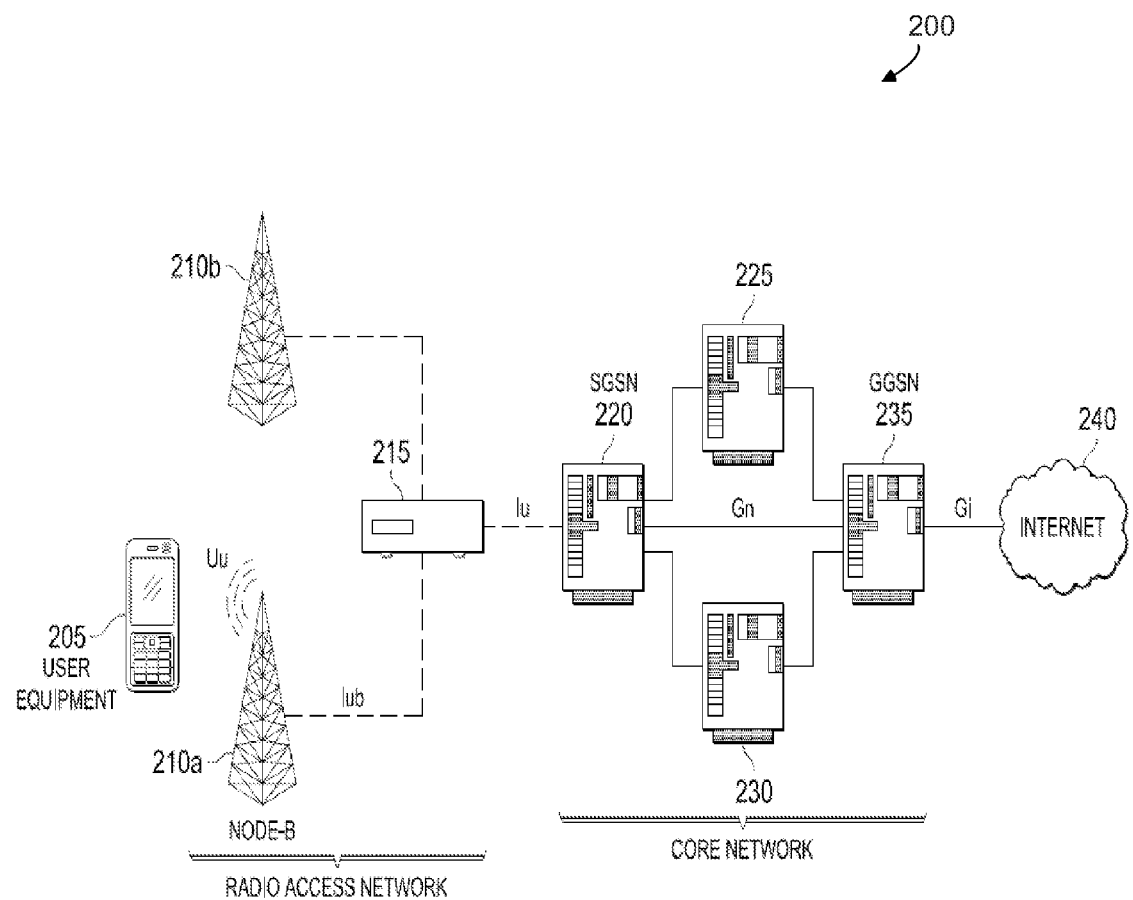
FIG. 2 is a schematic representation of a Universal Mobile Telecommunications System (UMTS) wireless cellular communication system.

FIG. 2 is an example system 200 of a Universal Mobile Telecommunications System (UMTS) wireless cellular communication system. The system 200 includes a UMTS-based radio access network (RAN), which is referred to as a UTRAN, and a third generation partnership project (3GPP) general packet radio service (GPRS) packet-switched core network. The core network provides connectivity to an external network such as the Internet 240. The system 200 includes one or more base stations such as Node-B base stations 210a and 210b that provide wireless service(s) to one or more devices such as UEs 205. A radio network controller (RNC) 215 can control the Node-B base stations 210a and 210b. The RNC 215 and the Node-B base stations 210a and 210b form a RAN. The system 200 can include system elements 220, 225, 230, 235 that perform one or more communication functions such as connection establishment and data routing. For example, the system 200 includes a Serving GPRS Support Node (SGSN) 220 that is responsible for routing traffic within a core network. The system 200 includes a Gateway GPRS Support Node (GGSN) 235 that is responsible for enabling the ingress/egress of traffic from/to the Internet 240. The GGS 235 can allocate IP addresses to UEs 205.

The network interfaces, for a UMTS-based system, include the Uu interface defined between a UE and a Node-B, the Iub interface defined between a Node-B and a RNC, the Iu interface defined between a RNC and a SGSN, the Gn interface defined between a SGSN and a GGSN, the Gi interface defined between a GGSN and an external packet data network. User-plane connectivity through the radio access network and core network can include establishing network interfaces between the UE and Node-B (e.g., Uu interface), Node-B and RNC (e.g., Iub interface), RNC and SGSN (e.g., Iu interface), SGSN and GGSN (e.g., Gn interface), and GGSN and the Internet (e.g., Gi interface). The establishment of one or more of these network interfaces can be associated with a radio connection state or sub-state as a function of the current activity level. For example, the Uu, Iub and Iu connections may be established for active user-plane data communication.

Similar to the LTE-based system, the UMTS-based system 200 enables the UEs 205 to switch from one base station to another base station as the UEs 205 move across cell boundaries. The base stations 210a and 210b may transmit mobility parameters such as cell reselection timer and cell reselection hysteresis parameter to the UEs 205. The cell reselection timer determines a time period that the UE needs to wait before executing a cell reselection procedure when a neighbor cell becomes higher ranked than the current serving cell. The cell reselection hysteresis parameter (e.g., 0-24 dB) is added to the measured serving cell power when comparing the measured serving cell power to the neighboring cell power during the cell ranking process. In these instances, the UE may initiate the cell reselection only when the measured neighboring cell power is higher than the serving cell power by at least the value of the cell reselection hysteresis parameter. The UEs 205 may execute the mobility procedures using the provided mobility parameters. In some implementations, the UEs 205 may scale the mobility parameters according to the UE speed or mobility state to increase the success rate of mobility procedures. For example, the UEs 205 may scale down the cell reselection timer when the UEs 205 are identified as being in a high mobility state. The UEs in the high mobility state may also scale down the cell reselection hysteresis parameter, which is the hysteresis value for cell reselection ranking criteria. The UEs 205 may determine their mobility states by utilizing broadcasted cell reselection parameters. Alternatively or in addition, the UEs 205 may determine their mobility state using a location system such as GPS.

Figure 3:
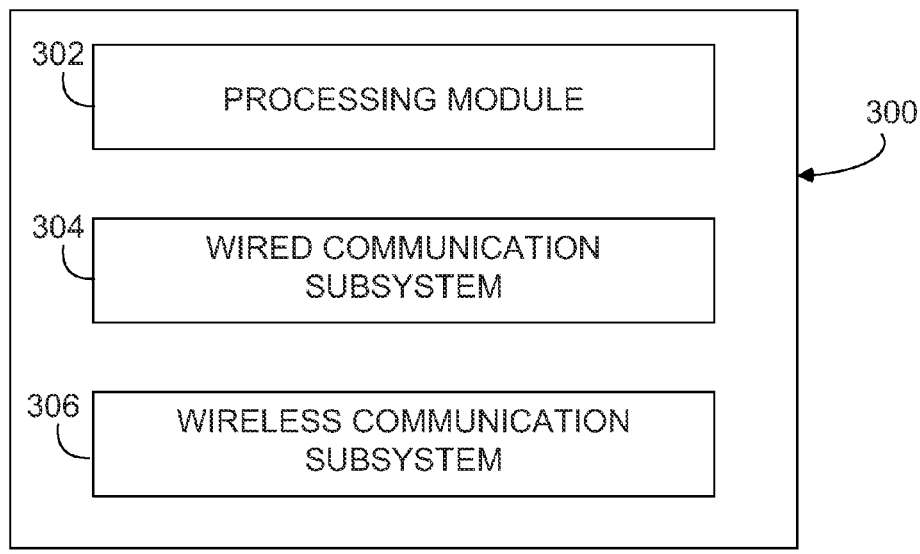
FIG. 3 is a schematic block diagram illustrating an access node device.

FIG. 3 is a schematic block diagram 300 illustrating an access node device. The illustrated device 300 includes a processing module 302, a wired communication subsystem 304, and a wireless communication subsystem 306. The processing module 302 can include one or more processing components (alternatively referred to as "processors" or "central processing units (CPUs)") capable of executing instructions related to one or more of the processes, steps, or actions described above in connection with one or more of the implementations disclosed herein. The processing module 302 can also include other auxiliary components, such as random access memory (RAM), read only memory (ROM), secondary storage (for example, a hard disk drive or flash memory), or others. In some implementations, the processing module 302 may be configured to mobility parameters for the UE. The mobility parameters may include cell reselection parameters and cell handover parameters. The access node device 300 may broadcast the cell reselection parameters (e.g., cell reselection timer Treselection, cell reselection hysteresis parameter Qhyst, duration for evaluating a number of cell reselections $T_{CRmax}$, minimum number of cell reselections for a medium mobility state $N_{CR\_M}$) using a System Information Block Type 3 (SIB3) message. The processing module 302 may also be configured to determine speed dependent scaling factors associated with the mobility parameters. The processing module 302 can execute certain instructions and commands to provide wireless or wired communication, using the wired communication subsystem 304 or a wireless communication subsystem 306. A skilled artisan may readily appreciate that other components may also be included in the device 300 without departing from the scope of the disclosure.

Figure 4:
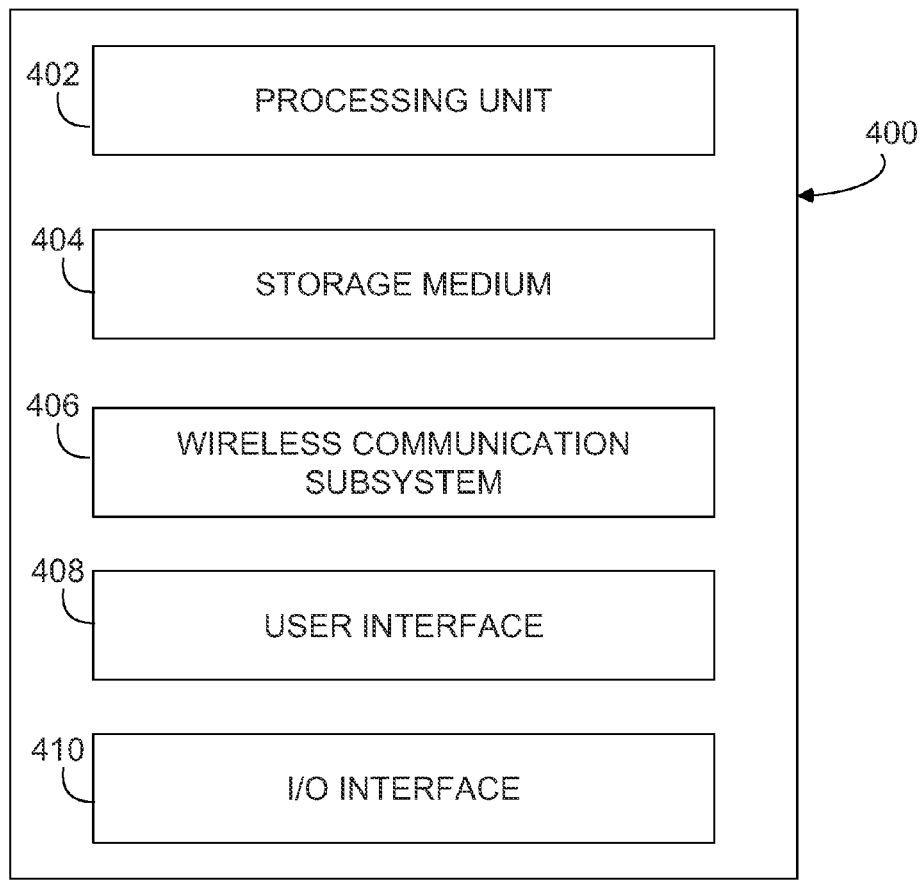
FIG. 4 is a schematic block diagram illustrating a user equipment device.

FIG. 4 is a schematic block diagram 400 illustrating a user equipment device. The illustrated device 400 includes a processing unit 402, a computer readable storage medium 404 (for example, ROM or flash memory), a wireless communication subsystem 406, a user interface 408, and an I/O interface 410.

Similar to the processing module 302 of FIG. 3, the processing unit 402 can include one or more processing components (alternatively referred to as "processors" or "central processing units (CPUs)") configured to execute instructions related to one or more of the processes, steps, or actions described above in connection with one or more of the implementations disclosed herein. In some implementations, the processing unit 402 may be configured to determine speed dependent scaling factors associated with the mobility parameters. Subsequently, the processing unit 402 may apply the speed dependent scaling factors to the associated mobility parameters and execute mobility procedures (e.g., cell reselection, cell handover) using the scaled mobility parameters. The processing unit 402 may also include other auxiliary components, such as random access memory (RAM) and read only memory (ROM). The computer readable storage medium 404 can store an operating system (OS) of the device 400 and various other computer executable software programs for performing one or more of the processes, steps, or actions described above.

The wireless communication subsystem 406 is configured to provide wireless communication for data and/or control information provided by the processing unit 402. The wireless communication subsystem 406 can include, for example, one or more antennas, a receiver, a transmitter, a local oscillator, a mixer, and/or a digital signal processing (DSP) unit. In some implementations, the subsystem 406 can support multiple input multiple output (MIMO) transmissions.

The user interface 408 can include, for example, one or more of a screen or touch screen (for example, a liquid crystal display (LCD), a light emitting display (LED), an organic light emitting display (OLED), a microelectromechanical system (MEMS) display), a keyboard or keypad, a trackball, a speaker, and/or a microphone. The I/O interface 410 can include, for example, a universal serial bus (USB) interface. A skilled artisan may readily appreciate that various other components can also be included in the device 400.

Figure 5:
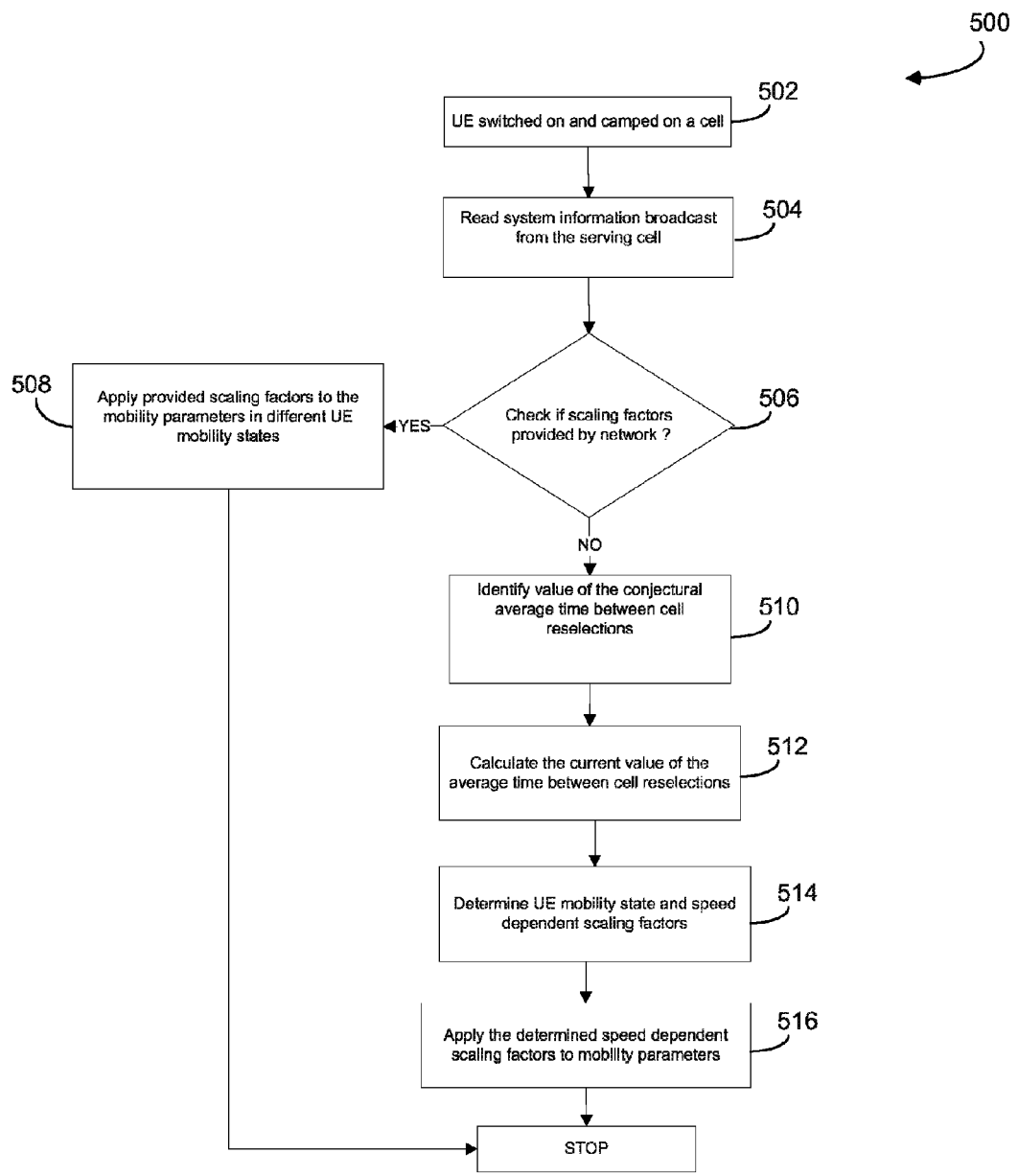
FIG. 5 is a flow chart illustrating an example method for self-optimizing mobility state dependent scaling mechanism in a user equipment.

FIG. 5 is a flow chart 500 illustrating an example method for self-optimizing, by a UE, mobility state dependent scaling factors. As shown in FIG. 5, the UE camps on an initial cell at step 502. The initial cell may have the strongest received signal strength when the UE is switched on. The initial cell may be referred to as a serving cell. At step 504, the UE may receive broadcast system information from the serving cell. For example, the serving cell may broadcast System Information Block (SIB) messages including or otherwise identifying the system information. The system information may include at least one of serving cell radio resource configuration information, cell reselection information, mobility parameters, neighboring cell information, or others. After receiving the system information, the UE may determine whether the network transmitted speed dependent scaling factors for mobility parameters at step 506. For example, the UE may determine whether the speed dependent scaling factors for cell reselection parameters (e.g., Qhyst, Treselection) are contained in the SIB3 message received from the serving cell. The UE may also determine whether the network has transmitted the speed dependent scaling factors for cell handover parameters (e.g., time-to-trigger and measurement report event trigger threshold). The time-to-trigger parameter determines a time period that the UE has to wait before sending a measurement report to the base station when a neighboring cell is detected with better signal quality or strength. The measurement report event trigger threshold determines a margin by which the signal quality or strength of the neighboring cell has to be higher than the serving cell to initiate transmission of a measurement report. For example, the UE may determine whether the speed dependent scaling factors for cell handover parameters are identified by Radio Resource Configuration (RRC) messages received from the serving cell.

If the scaling factors for the mobility parameters are provided by the network, the UE may apply the provided scaling factors to the mobility parameters based on the UE mobility state at step 508. In some implementations, the base station may indicate to the UE whether the UE may overwrite the provided speed dependent mobility parameters. If the scaling factors are not provided by the network, the UE may determine the scaling factors. The UE may first identify a conjectural average time between cell reselections Tbetween_reselections_avg_m at step 510. The conjectural average time between cell reselections, i.e., Tbetween_reselections_avg_m, may be calculated based on the broadcasted parameters $T_{CRmax}$, i.e., a duration for evaluating a number of cell reselections, and $N_{CR\_M}$, i.e., a minimum number of cell reselections for a medium mobility state. In some implementations, the conjectural average time between cell reselections may be calculated by $T_{CRmax}/N_{CR\_M}$, which is a ratio of $T_{CRmax}$ to $N_{CR\_M}$. The base station may transmit, to the UE, the broadcasted parameters in a SIB3 message.

The UE may then calculate the current value of the average time between cell reselections at step 512. The current value of the average time between cell reselections, i.e., Tbetween_reselection_avg, may depend on the speed of the UE. For example, a high-speed UE may have a smaller average time between cell reselections, i.e., Tbetween_reselection_avg, than a low-speed UE. In particular, the history of UE cell reselections may be used to calculate the current value of the average time between cell reselections. In some implementation, the total time duration for the last $N_{CR\_M}$ cell reselections divided by $N_{CR\_M}$ may be the current value of the average time between cell reselections, i.e., Tbetween_reselection_avg.

At step 514, the UE may then determine the mobility state and the speed dependent scaling factors based on Tbetween_reselections_avg_m, i.e., the conjectural average time between cell reselections, and Tbetween_reselection_avg, i.e., the current value of the average time between cell reselections. For example, the UE may determine a low mobility state when Tbetween_reselection_avg is greater than Tbetween_reselections_avg_m. In some instances, the UE may determine a high mobility state when Tbetween_reselection_avg is much smaller than Tbetween_reselections_avg_m and, thus, scale down the related mobility parameters (e.g., cell reselection timer, cell reselection hysteresis parameter, time-to-trigger, measurement report event trigger threshold). An example of determining the speed dependent scaling factors is described in connection with FIG. 7.

Subsequently, the UE may apply the determined speed dependent scaling factors to the mobility parameters at step 516. Therefore, the mobility parameters may be adjusted based on the UE speed. The UE may execute mobility procedures, such as cell reselection and cell handover, using the adjusted mobility parameters to increase the success rate of the mobility procedures. As the speed of the UE changes, the UE may update the mobility state and the speed dependent scaling factors and re-adjust the mobility parameters correspondingly. In some implementations, the UE may periodically update the current value of the average time between cell reselections based on the recent history of the UE cell reselections and re-determine the mobility state and speed dependent scaling factors.

Figure 6:
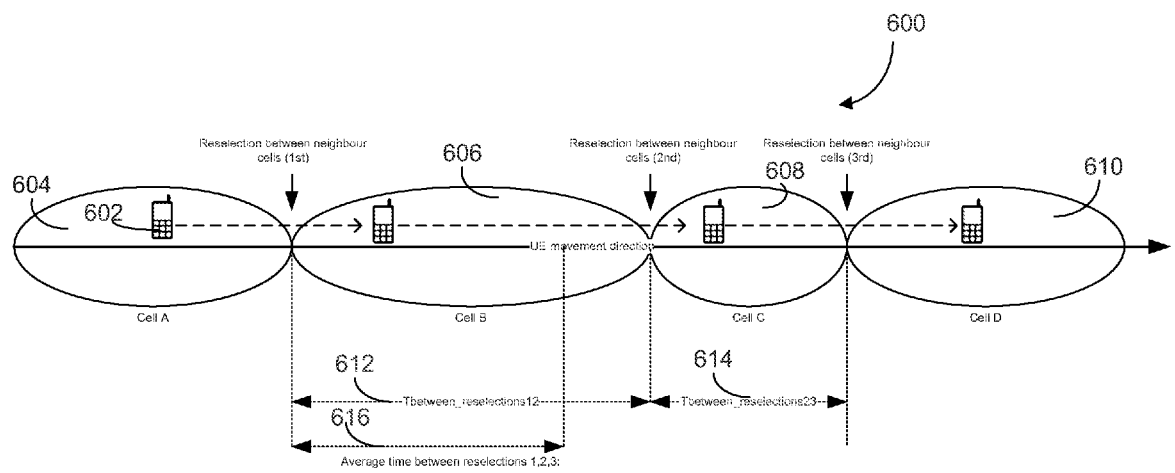
FIG. 6 is a schematic diagram illustrating an example method for calculating current value of an average time between cell reselections.

FIG. 6 is a schematic diagram 600 illustrating an example method for calculating a current value of an average time between cell reselections. As shown in FIG. 6, the UE 602 travels through cell A 604, cell B 606, cell C 608, and cell D 610 during a certain period of time. In this example, the cell reselection from cell A 604 to cell B 606 is referred to as the $1^{st}$ cell reselection, the cell reselection from cell B 606 to cell C 608 is referred to as the $2^{nd}$ cell reselection, and the cell reselection from cell C 608 to cell D 610 is referred to as the $3^{rd}$ cell reselection. The UE may measure the time duration that the UE camped on the previous cell each time a cell reselection occurs. For example, the time duration 612 that the UE camped on cell B before moving to cell C, i.e., the time duration between the $1^{st}$ cell reselection and $2^{nd}$ cell reselection (i.e., Tbetween_reselection12), may be measured, and the UE 602 may calculate the current value of the average time between cell reselections (i.e., Tbetween_reselection_avg) using Tbetween_reselection12. Similarly, the time duration 614 between the $2^{nd}$ cell reselection and $3^{rd}$ cell reselection (i.e., Tbetween_reselection23) may be measured and used to calculate the current value of the average time between cell reselections. The time duration between different cell reselections may vary because cell sizes may be different and the UE speed may vary. For example, time duration 612 is longer than time duration 614, as shown in FIG. 6. The UE 602 may store a number of most recent cell reselection times, discard out-dated cell reselection times, and use part or all of the stored cell reselection times to calculate the current value of the average time between cell reselections (i.e., Tbetween_reselection_avg). In the illustrated example, the UE calculates the current value of the average time between cell reselections 616 based on cell reselection times 612 and 614. Specifically, the current value of the average time between cell reselections 616 may be calculated by the total of the cell reselection times 612 and 614 divided by the number of cell reselections (which is 2 in this case). In some implementations, ping-pong reselections, i.e., continuous back and forth reselection between two cells, may be excluded from the calculations of cell reselection time.

Although the current value of the average time between cell reselections is calculated in FIG. 6, in some implementations, the current value of the average time between cell handovers may be calculated instead to determine the UE mobility state and the speed dependent scaling factors. For example, the UE may determine the mobility state and the speed dependent scaling factors at step 514 (shown in FIG. 5) based on Tbetween_reselections_avg_m, i.e., the conjectural average time between cell reselections, and Tbetween_handover_avg, i.e., the current value of the average time between cell handovers. The UE may determine a low mobility state when Tbetween_handover_avg is greater than Tbetween_reselections_avg_m. On the other hand, the UE may determine a high mobility state when Tbetween_handover_avg is much smaller than Tbetween_reselections_avg_m and, thus, scale down the related mobility parameters accordingly. The current value of the average time between cell handovers may be calculated based on time durations between cell handovers, similar to the example method shown in FIG. 6. In particular, the UE may measure a time duration that the UE stays at the previous cell each time when a cell handover occurs, and the UE may calculate the current value of the average time between cell handover, i.e., Tbetween_handover_avg, using a subset or all of the stored cell handover times. In some implementations, when the UE is in a RRC connected mode with a base station, the UE may calculate the current value of the average time between cell handovers and determine the UE mobility state and the speed dependent scaling factors based on the current value. When the UE is in an idle mode and is not actively connected with the base station, the UE may calculate the current value of the average time between cell reselections and determine the UE mobility state and the speed dependent scaling factors based on the current value.

Figure 7:
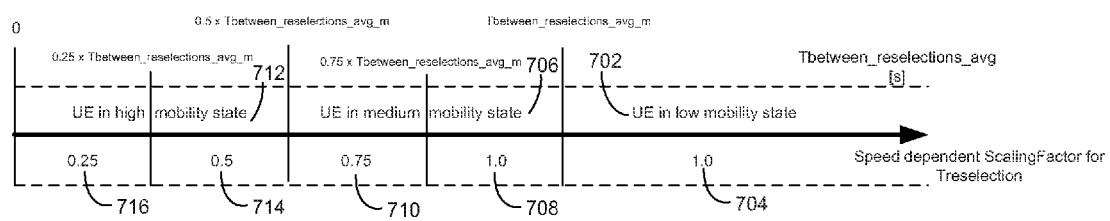
FIG. 7 is a schematic diagram illustrating an example method for determining speed dependent scaling factors.

FIG. 7 is a schematic diagram 700 illustrating an example method for determining speed dependent scaling factors for different time periods. As shown in FIG. 7, different UE mobility states and speed dependent scaling factors may be determined based on the conjectural average time between cell reselections, i.e., Tbetween_reselections_avg_m, and the current value of the average time between cell reselections, i.e., Tbetween_reselection_avg. During period 702, the UE may determine a low mobility state when Tbetween_reselection_avg is greater than Tbetween_reselections_avg_m. Correspondingly, the speed dependent scaling factor for Treselection, i.e., cell reselection timer, may be 1.0, as shown at period 704, which means that no scaling would be applied to the value of Treselection. Alternatively, the UE may be in a medium mobility state at period 706 when Tbetween_reselection_avg is greater than 0.5×Tbetween_reselections_avg_m and less than Tbetween_reselections_avg_m. The speed dependent scaling factor for Treselection may be determined to be 1.0 when Tbetween_reselection_avg is greater than 0.75×Tbetween_reselections_avg_m, as shown at period 708. The speed dependent scaling factor for Treselection may be 0.75 when Tbetween_reselection_avg is less than 0.75×Tbetween_reselections_avg_m, as shown at period 710. Therefore, different speed dependent scaling factors may be selected for the medium mobility state based on the current value of the average time between cell reselections. In other words, this process may increase the granularity of the speed dependent scaling factors resulting in a higher resolution. Similarly, the UE may determine a high mobility state at period 712 when Tbetween_reselection_avg is less than 0.5×Tbetween_reselections_avg_m. The speed dependent scaling factor for Treselection may be 0.5 when Tbetween_reselection_avg is greater than 0.25×Tbetween_reselections_avg_m, as shown at period 714. The speed dependent scaling factor for Treselection may be 0.25 when Tbetween_reselection_avg is less than 0.25×Tbetween_reselections_avg_m, as shown at 716.

FIG. 7 is a diagram 700 illustrating an example method for determining the speed dependent scaling factors. Other scaling factors may be used in connection with each mobility state. Higher or lower resolutions for the scaling factors may be used for each mobility state as well. For example, the medium mobility state may include three different scaling factors 0.65, 0.8, and 1, and one of these values may be selected based on the current value of the average time between cell reselections. Further, for different mobility parameters, different scaling factors or operations may be used for each mobility state. As an example, for cell reselection hysteresis parameter (i.e., Qhyst), an additive scaling operation may be used instead of the multiplicative scaling operation. For instance, a scaling factor of −2 dB or 0 dB may be selected for the medium mobility state based on the current value of the average time between cell reselections. For the high mobility state, a scaling factor of −5 dB or −3 dB may be selected. Other values of the scaling factors may be configured and selected by the UE as well for each mobility state. Multiple mobility parameters may be scaled using different scaling factors for each mobility state. In some implementations, the time-to-trigger value used in the cell handover procedures may be scaled using a similar method as the method for scaling the cell reselection timer shown in FIG. 7. Additionally, the measurement report event trigger threshold used in the cell handover procedures may be scaled using an additive scaling operation similar to the method for scaling the cell hysteresis parameter.

Although the current value of the average time between cell reselections is used to determine the UE mobility state and the speed dependent scaling factors, as shown in FIG. 7, the current value of the average time between cell handovers may be used to determine the UE mobility state and the speed dependent scaling factors. For example, the UE may have a low mobility state when Tbetween_handover_avg, i.e., the current value of the average time between cell handovers, is greater than Tbetween_reselections_avg_m. Correspondingly, the speed dependent scaling factor for Treselection, i.e., cell reselection timer, may be determined to be 1.0, which means that no scaling would be applied to the value of Treselection. Alternatively, the UE may be at a medium mobility state when Tbetween_handover_avg is greater than 0.5×Tbetween_reselections_avg_m and less than Tbetween_reselections_avg_m. The speed dependent scaling factor for Treselection may be 1.0 when Tbetween_handover_avg is greater than 0.75×Tbetween_reselections_avg_m. The speed dependent scaling factor for Treselection may be 0.75 when Tbetween_handover_avg is less than 0.75×Tbetween_reselections_avg_m. Similarly, the UE may be at a high mobility state when Tbetween_handover_avg is less than 0.5×Tbetween_reselections_avg_m. The speed dependent scaling factor for Treselection may be 0.5 when Tbetween_handover_avg is greater than 0.25×Tbetween_reselections_avg_m. The speed dependent scaling factor for Treselection may be 0.25 when Tbetween_handover_avg is less than 0.25×Tbetween_reselections_avg_m.

In some implementations, the UE may use GPS to determine the speed of the UE and then directly determine the speed dependent scaling factors based on the UE speed. For example, when the UE speed is within a range of 0-30 kilometer (km) per hour, the scaling factor for Treselection may be set to 1.0. The scaling factor for Treselection may be set to 0.75 when the UE speed is within a range of 30-60 km per hour. The scaling factor for Treselection may be set to 0.5 when the UE speed is within a range of 60-130 km per hour. The scaling factor for Treselection may be set to 0.25 when the UE speed is higher than 130 km per hour. Different speed dependent scaling factors may be used based on the determined speed of the UEs. The number of possible scaling factors is not limited by this disclosure and may be determined, e.g., by a mobile phone manufacturer. Further, the UE may use other positioning techniques to determine the speed of the UE and then determine the speed dependent scaling factors based on the UE speed.

In some implementations, when the speed dependent scaling factors are provided by the network, the UE may compare them with the values provided by the self-optimizing speed dependent scaling method and determine which to apply. As shown in FIG. 7, the self-optimizing speed dependent scaling method enables the UE to automatically determine the mobility state and speed dependent scaling factors. The UE may determine the resolution of the mobility state and the speed dependent scaling factors based on the mobility performance requirements and the UE processing power. This method simplifies the mobility configuration of the wireless communication system, reduces network configuration, maintenance and management cost for a mobile operator, and improves the UE mobility performance.

While several implementations have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure as applied to various implementations, it may be understood that various omissions and substitutions and changes in the form and details of the system illustrated may be made by those skilled in the art, without departing from the intent of the disclosure.

What is claimed is:

1. A method in a user equipment (UE), comprising:
receiving a broadcast message identifying a period for evaluating a number of cell reselections and a specified number of cell reselections in a mobility state;
calculating a conjectural average time between cell reselections based on the period for evaluating the number of cell reselections and the specified number of cell reselections in the mobility state;
determining, by the UE, a speed dependent scaling factor based on the conjectural average time between cell reselections and a current value of a average time between cell reselections;
adjusting a mobility parameter based on the speed dependent scaling factor; and
executing a mobility procedure using the adjusted mobility parameter,
wherein the broadcast message comprises a system information broadcast (SIB) message identifying the period for evaluating the number of cell reselections and the minimum number of cell reselections in a medium mobility state.

2. The method of claim 1, wherein determining the mobility parameter includes applying the speed dependent scaling factor to a parameter received from a base station.

3. The method of claim 1, wherein the mobility procedure comprises a cell reselection procedure.

4. The method of claim 1, wherein the speed dependent scaling factor is associated with a cell reselection timer or a cell reselection hysteresis parameter.

5. The method of claim 1, wherein the speed dependent scaling factor is one of a plurality of different speed dependent scaling factors associated with a mobility state.

6. The method of claim 5, wherein determining the speed dependent scaling factor comprises selecting the speed dependent scaling factor from the plurality of speed dependent scaling factors associated with the mobility state.

7. The method of claim 1, further comprising determining a speed of the UE using a global positioning system (GPS), wherein the speed dependent scaling factor is based on the determined speed.

8. The method of claim 1, wherein the mobility procedure comprises a cell handover procedure.

9. The method of claim 8, wherein the speed dependent scaling factor is associated with a time-to-trigger parameter or a measurement report event trigger threshold.

10. A user equipment (UE) comprising one or more processors configured to:
receive a broadcast message identifying a period for evaluating a number of cell reselections and a specified number of cell reselections in a mobility state;
calculate a conjectural average time between cell reselections based on the period for evaluating the number of cell reselections and the specified number of cell reselections in the mobility state;
determine, by the UE, a speed dependent scaling factor based on the conjectural average time between cell reselections and a current value of a average time between cell reselections;
adjust a mobility parameter based on the speed dependent scaling factor; and
execute a mobility procedure using the adjusted mobility parameter,
wherein the broadcast message comprises a system information broadcast (SIB) message identifying the period for evaluating the number of cell reselections and the minimum number of cell reselections in a medium mobility state.

11. The user equipment of claim 10, wherein determining the mobility parameter includes applying the speed dependent scaling factor to a parameter received from a base station.

12. The user equipment of claim 10, wherein the mobility procedure comprises a cell reselection procedure.

13. The user equipment of claim 10, wherein the speed dependent scaling factor is associated with a cell reselection timer or a cell reselection hysteresis parameter.

14. The user equipment of claim 10, wherein the speed dependent scaling factor is one of a plurality of different speed dependent scaling factors associated with a mobility state.

15. The user equipment of claim 14, wherein determining the speed dependent scaling factor comprises selecting the speed dependent scaling factor from the plurality of speed dependent scaling factors associated with the mobility state.

16. The user equipment of claim 10, the one or more processors further configured to determine a speed of the UE using a global positioning system (GPS), wherein the speed dependent scaling factor is based on the determined speed.

17. The user equipment of claim 10, wherein the mobility procedure comprises a cell handover procedure.

18. The user equipment of claim 17, wherein the speed dependent scaling factor is associated with a time-to-trigger parameter or a measurement report event trigger threshold.

* * * * *